US012670213B2

(12) United States Patent
Kukulinski et al.

(10) Patent No.: US 12,670,213 B2
(45) Date of Patent: Jun. 30, 2026

(54) MICROSERVICES APPLICATION SERVICE HUB

(71) Applicant: KONG INC., San Francisco, CA (US)

(72) Inventors: Ross Kukulinski, Kirkland, WA (US); Reza Shafii, Sausalito, CA (US); David Erichsen, Minneapolis, MN (US); Andrew Kimberly, Urbana, IL (US); Yongtao Tang, Boise, ID (US); Gabriella Angiolillo, San Francisco, CA (US); Wanny Morellato, North Bend, WA (US); Samantha Hepler, Austin, TX (US)

(73) Assignee: KONG INC., San Francisco, CA (US)

( * ) Notice: Subject to any disclaimer, the term of this patent is extended or adjusted under 35 U.S.C. 154(b) by 195 days.

(21) Appl. No.: 18/361,362

(22) Filed: Jul. 28, 2023

(65) Prior Publication Data

US 2024/0037147 A1 Feb. 1, 2024

Related U.S. Application Data

(60) Provisional application No. 63/370,087, filed on Aug. 1, 2022.

(51) Int. Cl.
*G06F 16/901* (2019.01)
*G06F 9/54* (2006.01)

(52) U.S. Cl.
CPC ............ *G06F 16/901* (2019.01); *G06F 9/547* (2013.01)

(58) Field of Classification Search
CPC ....... G06F 16/901; G06F 9/547; G06F 9/5038
See application file for complete search history.

(56) References Cited

U.S. PATENT DOCUMENTS

| | | | | | |
|---|---|---|---|---|---|
| 2010/0145814 | A1* | 6/2010 | Meghani | ................ | G06Q 30/06 |
| | | | | | 705/26.1 |
| 2018/0041467 | A1* | 2/2018 | Vats | ...................... | H04L 9/0891 |
| | | | | | 707/737 |
| 2019/0102206 | A1* | 4/2019 | Fichtenholtz | ......... | G06F 9/5027 |
| | | | | | 707/737 |
| 2019/0179894 | A1* | 6/2019 | Anerousis | ................. | G06F 8/70 |
| | | | | | 707/737 |

(Continued)

*Primary Examiner* — Yuk Ting Choi
(74) *Attorney, Agent, or Firm* — Perkins Coie LLP; Colin Fowler; Willa Wu

(57) ABSTRACT

Operating a microservices registry hub that automatically discovers and sorts services. A microservice architecture application includes a plurality of services, the plurality of services are each an application program interface (API) performing a piecemeal function of an overall application function. The microservices registry hub stores an index of the services. The microservices registry hub is configured to enable consumption of services in execution environments. The service hub uses observation agents to monitor particular execution environments and generate a list of unsorted service data associated services available within that environment. That list is automatically pre-sorted based on a predetermined set of heuristic rules based on the index of the plurality of services. An administrator later goes through the pre-sorted service data and confirms whether or not that pre-sorting was correct. Upon receiving confirmation, the service is sorted or indexed into the registry in the manner that it was pre-sorted.

14 Claims, 17 Drawing Sheets

(56) References Cited

U.S. PATENT DOCUMENTS

| | | | |
|---|---|---|---|
| 2022/0012106 A1* | 1/2022 | Tan | G06F 8/44 |
| | | | 707/737 |
| 2022/0109741 A1* | 4/2022 | Chen | H04L 69/40 |
| | | | 707/737 |
| 2022/0197944 A1* | 6/2022 | Kaplingat | G06F 16/137 |
| | | | 707/737 |

* cited by examiner

*(DISTRIBUTED API GATEWAY)* agent 1
"cluster_advertise"
TCP+UDP:7946 agent 2
"cluster_advertise"
TCP+UDP:7946

NAT-layer / overlay network agent 1
"cluster_listen"
TCP+UDP:7946 agent 2
"cluster_listen"
TCP+UDP:7946

Cluster agent 1

Cluster agent 2

456

458

460

1400

MICROSERVICES APPLICATION SERVICE HUB

CROSS-REFERENCE TO RELATED APPLICATIONS

This application claims the benefit of priority to U.S. Provisional Application No. 63/370,087, filed Aug. 1, 2022, which is incorporated by reference herein in its entirety.

TECHNICAL FIELD

The disclosure relates to distributed microservice application networks and more particularly to architecture and data flow between application programming interfaces.

BACKGROUND

Application programming interfaces (APIs) are specifications primarily used as an interface platform by software components to enable communication with each other. For example, APIs can include specifications for clearly defined routines, data structures, object classes, and variables. Thus, an API defines what information is available and how to send or receive that information.

Microservices are a software development technique—a variant of the service-oriented architecture (SOA) architectural style that structures an application as a collection of loosely coupled services (embodied in APIs). In a microservices architecture, services are fine-grained and the protocols are lightweight. The benefit of decomposing an application into different smaller services is that it improves modularity. This makes the application easier to understand, develop, test, and become more resilient to architecture erosion. Microservices parallelize development by enabling small autonomous teams to develop, deploy and scale their respective services independently. Microservice-based architectures enable continuous delivery and deployment.

Setting up multiple APIs is a time-consuming challenge. This is because deploying an API requires tuning the configuration or settings of each API individually. The functionalities of each individual API are confined to that specific API and servers hosting multiple APIs are individually set up for hosting the APIs, this makes it very difficult to build new APIs or even scale and maintain existing APIs. This becomes even more challenging when there are tens of thousands of APIs and millions of clients requesting API-related services per day. Consequently, visualizing these APIs is a tedious and cumbersome activity.

DETAILED DESCRIPTION

Figure 1A:
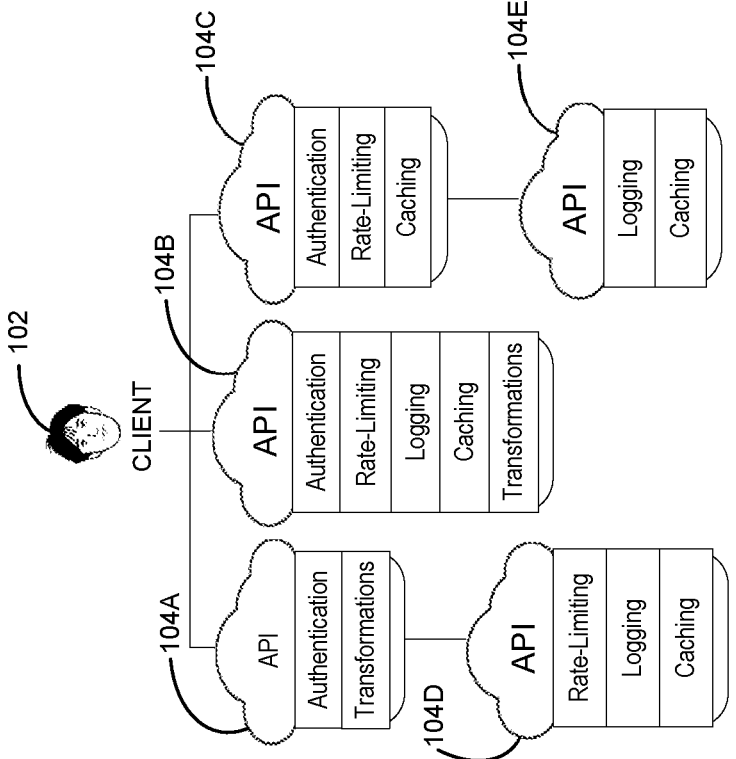
FIG. 1A illustrates a prior art approach with multiple APIs having functionalities common to one another.

The disclosed technology describes a cloud module (a service hub) that provides a registry of each microservice in a given microservice application. The registry represents a single source of truth that catalogs service inventory and dependencies. Each entry in the in the registry is a "service" and may break down into multiple versions.

Services are the top-level entity in Service Hub and represent what a user considers a 'Service,' i.e., an independent system delivering specific capabilities and owned by a team. This is the more 'abstract' portion of the service entry. For example, a given service represents a data transformation microservice or a billing API. A service version refers to one instance, or implementation, of the service with a unique configuration. Each service may have many versions, and each version can have different configurations, set up for a RESTful API, gPRC endpoint, GraphQL endpoint, and others. A main attribute of a Service is the endpoint URL(s) where consumers can send API requests. An administrator is enabled to specify the URL with a single string, or by specifying the service's protocol, host, port, and path individually. A service deployment refers to the concrete, runnable incarnation of a service version. A service may have zero or more deployments.

The service hub connected to a developer portal. Administrators publish services directly from the service hub to the developer portal, where application developers are able to search, discover, and consume existing services. Publication of the services to an available developer portal enables engineers within an ecosystem with access to the developer portal to select and consume the services in their respective projects.

Deployments represent components that comprise the 'implementation' of a service. For example, a gateway configuration or service mesh service. Services may be linked to many deployments, representing instances of the service in multiple environments. This is the more 'concrete' portion of the service entry.

Integrations are first-class entities in Service Hub and are scoped to a given product. They augment and extend core Service Hub functionality. Think of these sort of like DataDog or PagerDuty integrations.

Microservices Architecture

In network routing, the control plane is the part of the router architecture that is concerned with drawing the network topology, or the routing table that defines what to do with incoming packets. Control plane logic also can define certain packets to be discarded, as well as preferential treatment of certain packets for which a high quality of service is defined by such mechanisms as differentiated services.

In monolithic application architecture, a control plane operates outside the core application. In a microservices architecture, the control plane operates between each API that makes up the microservice architecture. Proxies operate linked to each API. The proxy attached to each API is referred to as a "data plane proxy." Examples of a data plane proxy include the sidecar proxies of Envoy proxies.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various embodiments given in this specification.

Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure are directed at systems, methods, and architecture for management of microservices APIs that together comprise an application. The architecture is a distributed cluster of gateway nodes that jointly provide. Providing the APIs includes providing a plurality of plugins that implement the APIs. As a result of a distributed architecture, the task of API management can be distributed across a cluster of gateway nodes or even web services. For example, some APIs that make up the microservices application architecture may run on Amazon AWS®, whereas others may operate on Microsoft Azure®. It is feasible that the same API may run multiple instances (e.g., multiple workers) on both AWS and Azure (or any other suitable web hosting service).

The gateway nodes effectively become the entry point for API-related requests from users. Requests that operate in between APIs (e.g., where one API communicates to another API) may have architecturally direct communication, though indicate communications/request response transactions to a control plane via data plane proxies. In some embodiments, inter-API requests may pass through a gateway depending on network topology, API configuration, or stewardship of an associated API. The disclosed embodiments are well-suited for use in mission critical deployments at small and large organizations. Aspects of the disclosed technology do not impose any limitation on the type of APIs. For example, these APIs can be proprietary APIs, publicly available APIs, or invite-only APIs.

FIG. 1A illustrates a prior art approach with multiple APIs having functionalities common to one another. As shown in FIG. 1A, a client 102 is associated with APIs 104A, 104B, 104C, 104D, and 104E. Each API has a standard set of features or functionalities associated with it. For example, the standard set of functionalities associated with API 104A are "authentication" and "transformations." The standard set of functionalities associated with API 104B are "authentication," "rate-limiting," "logging," "caching," and "transformations." Thus, "authentication" and "transformations" are functionalities that are common to APIs 104A and 104B. Similarly, several other APIs in FIG. 1A share common functionalities. However, it is noted that having each API handle its own functionalities individually causes duplication of efforts and code associated with these functionalities, which is inefficient. This problem becomes significantly more challenging when there are tens of thousands of APIs and millions of clients requesting API-related services per day.

Figure 1B:
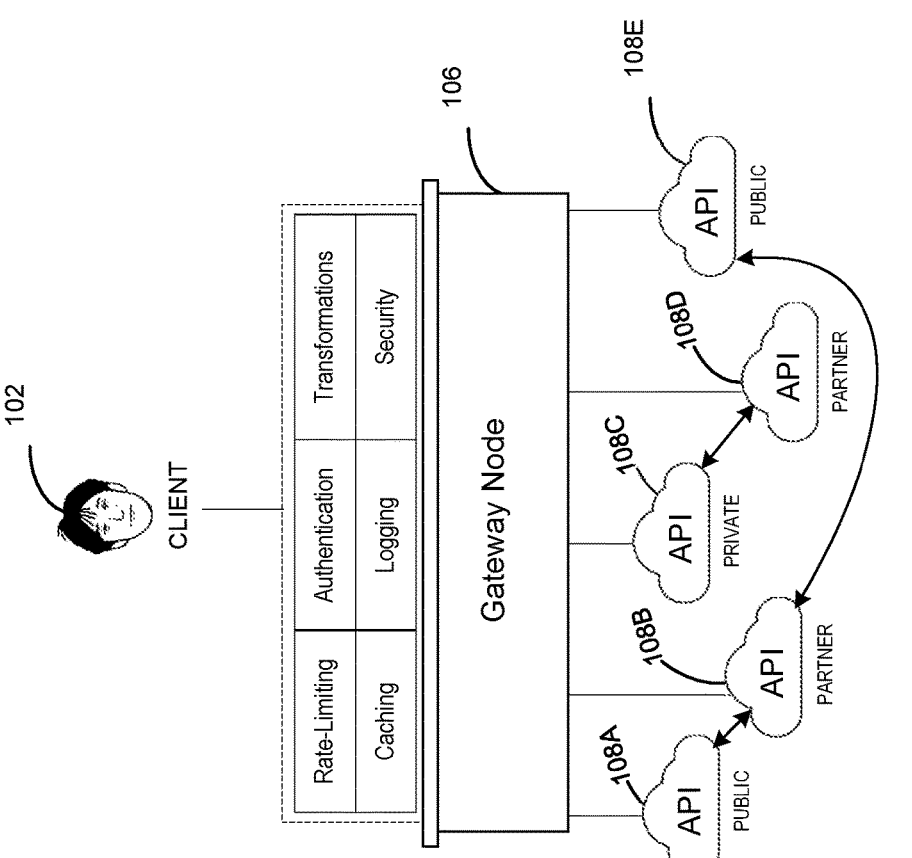
FIG. 1B illustrates a distributed API gateway architecture, according to an embodiment of the disclosed technology.

FIG. 1B illustrates a distributed API gateway architecture according to an embodiment of the disclosed technology. To address the challenge described in connection with FIG. 1A, the disclosed technology provides a distributed API gateway architecture as shown in FIG. 1B. Specifically, disclosed embodiments implement common API functionalities by bundling the common API functionalities into a gateway node 106 (also referred to herein as an API Gateway). Gateway node 106 implements common functionalities as a core set of functionalities that runs in front of APIs 108A, 108B, 108C, 108D, and 108E. The core set of functionalities include rate limiting, caching, authentication, logging, transformations, and security. It will be understood that the above-mentioned core set of functionalities are for examples and illustrations. There can be other functionalities included in the core set of functionalities besides those discussed in FIG. 1B. In some applications, gateway node 106 can help launch large-scale deployments in a very short time at reduced complexity and is therefore an inexpensive replacement for expensive proprietary API management systems. The disclosed technology includes a distributed architecture of gateway nodes with each gateway node bundled with a set of functionalities that can be extended depending on the use-case or applications.

Figure 2:
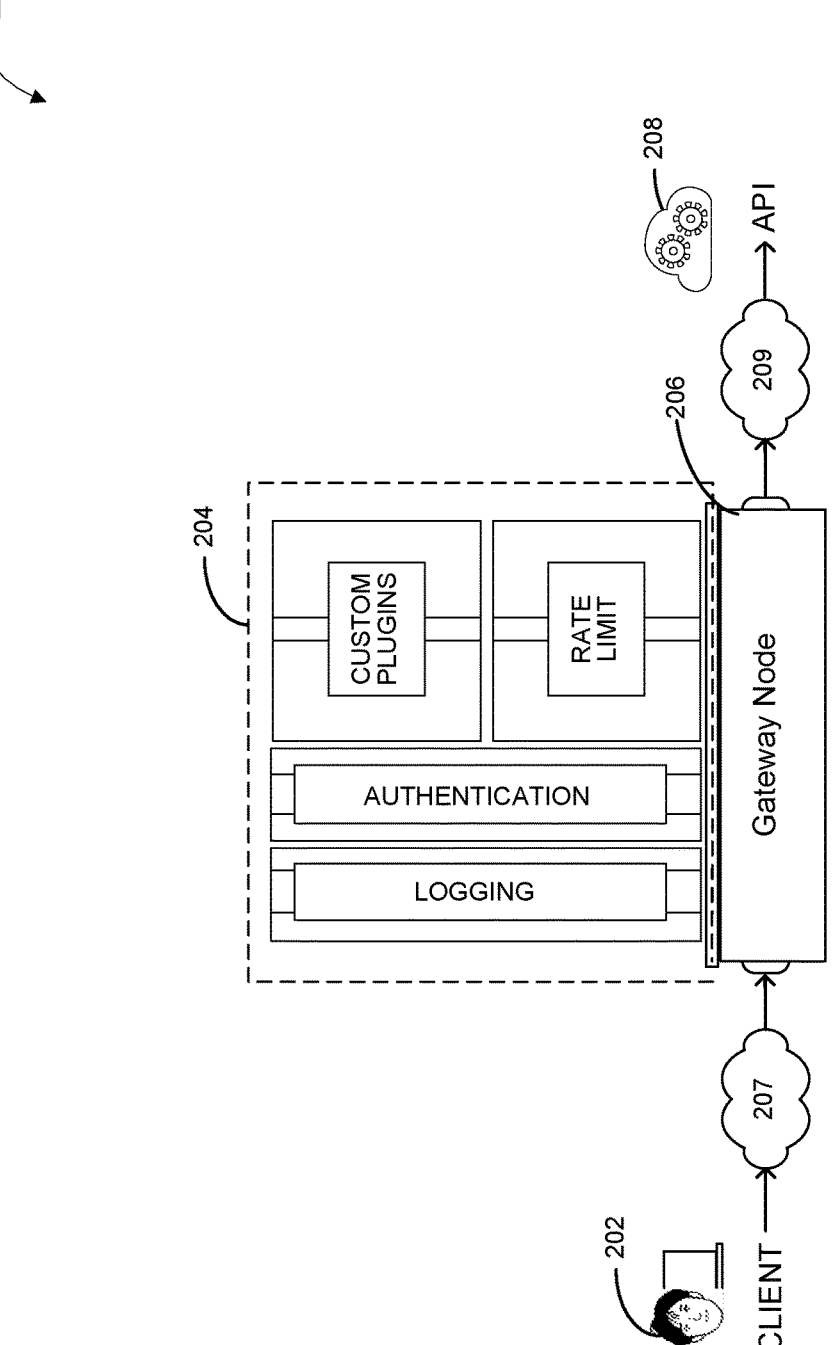
FIG. 2 illustrates a block diagram of an example environment suitable for functionalities provided by a gateway node, according to an embodiment of the disclosed technology.

FIG. 2 illustrates a block diagram of an example environment suitable for functionalities provided by a gateway node according to an embodiment of the disclosed technology. In some embodiments, a core set of functionalities are provided in the form of "plugins" or "add-ons" installed at a gateway node. (Generally, a plugin is a component that allows modification of what a system can do usually without forcing a redesign/compile of the system. When an application supports plug-ins, it enables customization. The common examples are the plug-ins used in web browsers to add new features such as search-engines, virus scanners, or the ability to utilize a new file type such as a new video format.)

As an example, a set of plugins 204 shown in FIG. 2 are provided by gateway node 206 positioned between a client 202 and one or more HTTP APIs. Electronic devices operated by client 202 can include, but are not limited to, a server desktop, a desktop computer, a computer cluster, a mobile computing device such as a notebook, a laptop computer, a handheld computer, a mobile phone, a smart phone, a PDA, and/or an iPhone or Droid device, etc. Gateway node 206 and client 202 are configured to communicate with each other via network 207. Gateway node 206 and one or more APIs 208 are configured to communicate with each other via network 209. In some embodiments, the one or more APIs reside in one or more API servers, API data stores, or one or more API hubs. Various combinations of configurations are possible.

Networks 207 and 209 can be any collection of distinct networks operating wholly or partially in conjunction to provide connectivity to/from client 202 and one or more APIs 208. In one embodiment, network communications can be achieved by, an open network, such as the Internet, or a private network, such as an intranet and/or the extranet. Networks 207 and 209 can be a telephonic network, an open network, such as the Internet, or a private network, such as an intranet and/or the extranet. For example, the Internet can provide file transfer, remote login, email, news, RSS, and other services through any known or convenient protocol, such as, but not limited to the TCP/IP protocol, Open System Interconnections (OSI), FTP, UPnP, iSCSI, NSF, ISDN, PDH, RS-232, SDH, SONET, etc.

Client 202 and one or more APIs 208 can be coupled to the network 150 (e.g., Internet) via a dial-up connection, a digital subscriber loop (DSL, ADSL), cable modem, wireless connections, and/or other types of connection. Thus, the client devices 102A-N, 112A-N, and 122A-N can communicate with remote servers (e.g., API servers 130A-N, hub servers, mail servers, instant messaging servers, etc.) that provide access to user interfaces of the World Wide Web via a web browser, for example.

The set of plugins 204 include authentication, logging, rate-limiting, and custom plugins, of which authentication, logging, traffic control, rate-limiting can be considered as the core set of functionalities. An authentication functionality can allow an authentication plugin to check for valid login credentials such as usernames and passwords. A logging functionality of a logging plugin logs data associated with requests and responses. A traffic control functionality of a traffic control plugin manages, throttles, and restricts inbound and outbound API traffic. A rate limiting functionality can allow managing, throttling, and restricting inbound and outbound API traffic. For example, a rate limiting plugin can determine how many HTTP requests a developer can make in a given period of seconds, minutes, hours, days, months or years.

A plugin can be regarded as a piece of stand-alone code. After a plugin is installed at a gateway node, it is available to be used. For example, gateway node 206 can execute a plugin in between an API-related request and providing an associated response to the API-related request. One advantage of the disclosed system is that the system can be expanded by adding new plugins. In some embodiments, gateway node 206 can expand the core set of functionalities by providing custom plugins. Custom plugins can be provided by the entity that operates the cluster of gateway nodes. In some instances, custom plugins are developed (e.g., built from "scratch") by developers or any user of the disclosed system. It can be appreciated that plugins, used in accordance with the disclosed technology, facilitate in centralizing one or more common functionalities that would be otherwise distributed across the APIs, making it harder to build, scale and maintain the APIs.

Other examples of plugins can be a security plugin, a monitoring and analytics plugin, and a transformation plugin. A security functionality can be associated with the system restricting access to an API by whitelisting or blacklisting/whitelisting one or more consumers identified, for example, in one or more Access Control Lists (ACLs). In some embodiments, the security plugin requires an authentication plugin to be enabled on an API. In some use cases, a request sent by a client can be transformed or altered before being sent to an API. A transformation plugin can apply a transformations functionality to alter the request sent by a client. In many use cases, a client might wish to monitor request and response data. A monitoring and analytics plugin can allow monitoring, visualizing, and inspecting APIs and microservices traffic.

In some embodiments, a plugin is Lua code that is executed during the life-cycle of a proxied request and response. In other embodiments, the code is in Go, Javascript, Python, and any language that compiles to WebAssembly (WASM). Through plugins, functionalities of a gateway node can be extended to fit any custom need or integration challenge. For example, if a consumer of the disclosed system needs to integrate their API's user authentication with a third-party enterprise security system, it can be implemented in the form of a dedicated (custom) plugin that is run on every request targeting that given API. One advantage, among others, of the disclosed system is that the distributed cluster of gateway nodes is scalable by simply adding more nodes, implying that the system can handle virtually any load while keeping latency low.

One advantage of the disclosed system is that it is platform agnostic, which implies that the system can run anywhere. In one implementation, the distributed cluster can be deployed in multiple data centers of an organization. In some implementations, the distributed cluster can be deployed as multiple nodes in a cloud environment. In some implementations, the distributed cluster can be deployed as a hybrid setup involving physical and cloud computers. In some other implementations, the distributed cluster can be deployed as containers.

Figure 3A:
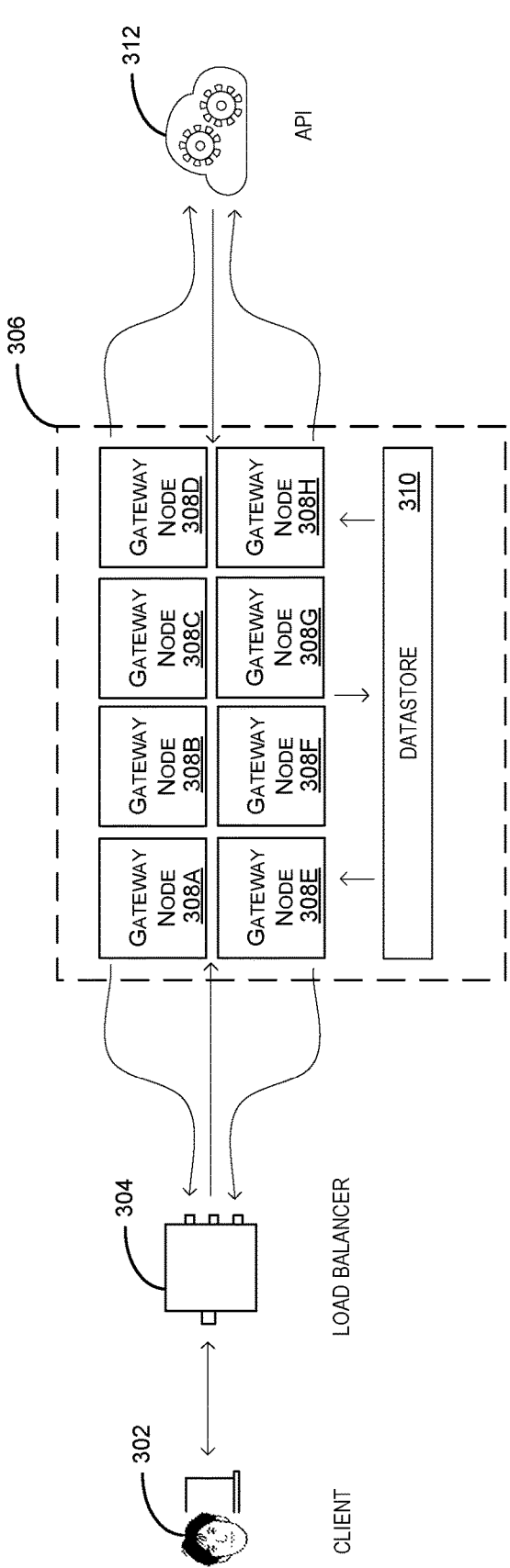
FIG. 3A illustrates a block diagram of an example environment with a cluster of gateway nodes in operation, according to an embodiment of the disclosed technology.

FIG. 3A illustrates a block diagram of an example environment with a cluster of gateway nodes in operation. In some embodiments, a gateway node is built on top of NGINX. NGINX is a high-performance, highly-scalable, highly-available web server, reverse proxy server, and web accelerator (combining the features of an HTTP load balancer, content cache, and other features). In an example deployment, a client 302 communicates with one or more APIs 312 via load balancer 304, and a cluster of gateway nodes 306. The cluster of gateway nodes 306 can be a distributed cluster. The cluster of gateway nodes 306 includes gateway nodes 308A-308H and data store 310. The functions represented by the gateway nodes 308A-308H and/or the data store 310 can be implemented individually or in any combination thereof, partially or wholly, in hardware, software, or a combination of hardware and software.

Load balancer 304 provides functionalities for load balancing requests to multiple backend services. In some embodiments, load balancer 304 can be an external load balancer. In some embodiments, the load balancer 304 can be a DNS-based load balancer. In some embodiments, the load balancer 304 can be a Kubernetes® load balancer integrated within the cluster of gateway nodes 306.

Data store 310 stores all the data, routing information, plugin configurations, etc. Examples of a data store can be Apache Cassandra or PostgreSQL. The datastore 310 is operated as a service within the service hub. Dataplanes connect in hybrid mode to the service hub SaaS control plane, and the datastore 310 is abstracted from the user. In accordance with disclosed embodiments, multiple gateway nodes in the cluster share the same data store, e.g., as shown in FIG. 3A. Because multiple gateway nodes in the cluster share the same data store, there is no requirement to associate a specific gateway node with the data store—data from each gateway node 308A-308H is stored in data store 310 and retrieved by the other nodes (e.g., even in complex multiple data center setups). In some embodiments, the data store shares configurations and software codes associated with a plugin that is installed at a gateway node. In some embodiments, the plugin configuration and code can be loaded at runtime.

Traditionally, the datastore 310 includes configured entities such as routes, services, and plugins. Hybrid mode, also known as control plane/data plane separation (CP/DP), removes the need for a database on every node. In this mode, nodes in a cluster are split into two roles: control plane, where configuration is managed and the Admin API is served from; and data plane, which serves traffic for the proxy. Each data plane node is connected to one of the control plane nodes, and only the control plane nodes are directly connected to a database. Instead of accessing the database contents directly, the data plane nodes maintain a connection with control plane nodes to receive the latest configuration.

Figure 3B:
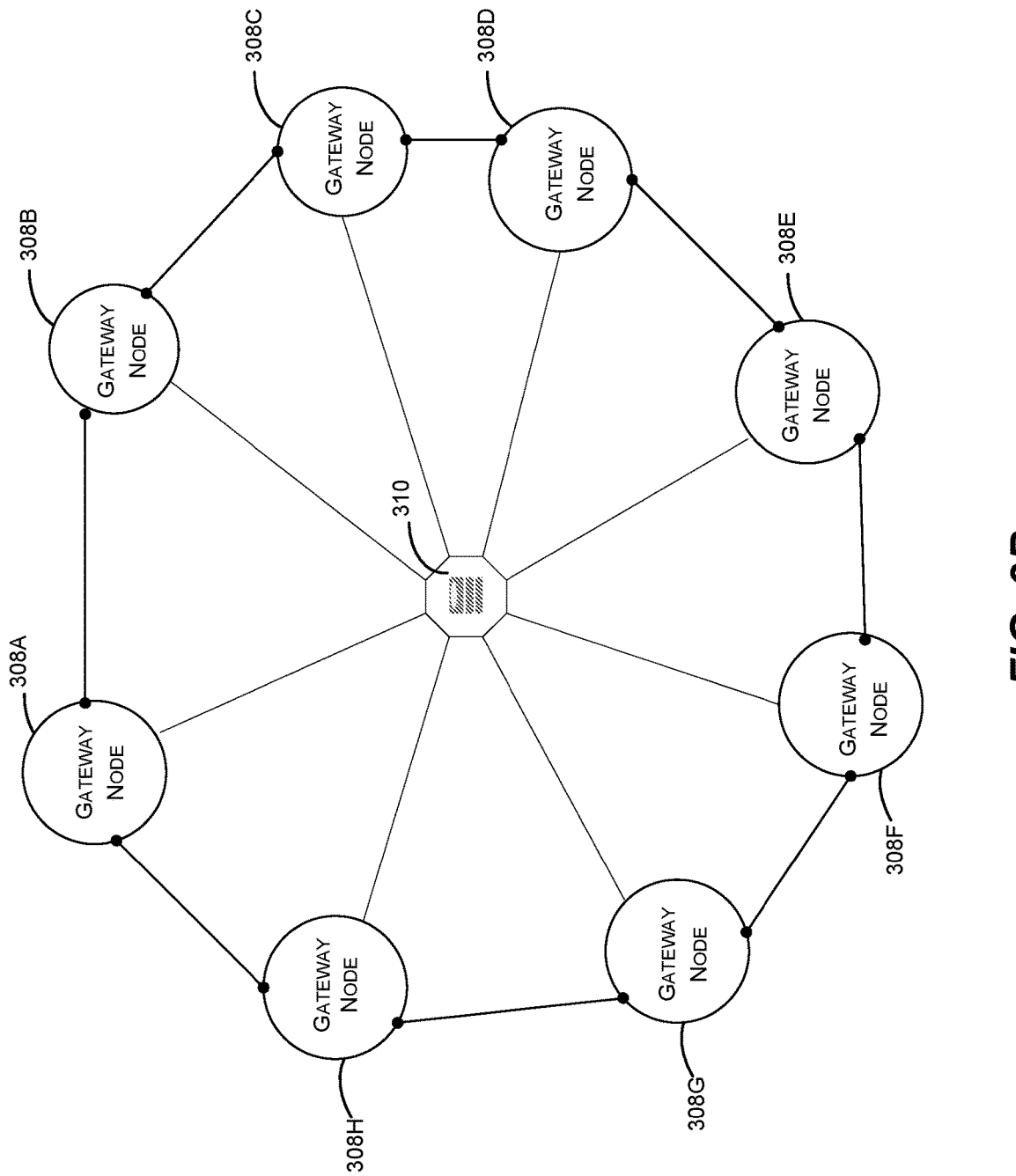
FIG. 3B illustrates a schematic of a data store shared by multiple gateway nodes, according to an embodiment of the disclosed technology.

FIG. 3B illustrates a schematic of a data store shared by multiple gateway nodes, according to an embodiment of the disclosed technology. For example, FIG. 3B shows data store 310 shared by gateway nodes 308A-308H arranged as part of a cluster.

One advantage of the disclosed architecture is that the cluster of gateway nodes allow the system to be scaled horizontally by adding more gateway nodes to encompass a bigger load of incoming API-related requests. Each of the gateway nodes share the same data since they point to the same data store. The cluster of gateway nodes can be created in one datacenter, or in multiple datacenters distributed across different geographical locations, in both cloud or on-premise environments. In some embodiments, gateway nodes (e.g., arranged according to a flat network topology) between the datacenters communicate over a Virtual Private Network (VPN) connection. The system can automatically handle a new gateway node joining a cluster or leaving a cluster. Once a gateway node communicates with another gateway node, it will automatically discover all the other gateway nodes due to an underlying gossip protocol.

In some embodiments, an administration API (e.g., internal RESTful API) for administration purposes is hosted as a service by a service management platform in the cloud, and configuration changes are streamed down to the dataplanes through the hybrid mechanism. Requests to the administration API can be sent to any node in the cluster. The administration API can be a generic HTTP API. Upon set up, each gateway node is associated with a consumer port and an admin port that manages the API-related requests coming into the consumer port. For example, port number 8001 is the default port on which the administration API listens and 8444 is the default port for HTTPS (e.g., admin_listen_ssl) traffic to the administration API.

In other embodiments, the gateways themselves don't have an administration API. Instead, the administration API is hosted as a service of an API platform in the cloud. Configuration changes are streamed down to the dataplanes through the hybrid mechanism.

In some instances, the administration API can be used to provision plugins. After a plugin is installed at a gateway node, it is available to be used, e.g., by the administration API or a declarative configuration.

In some embodiments, the administration API identifies a status of a cluster based on a health state of each gateway node. For example, a gateway node can be in one of the following states:

active: the node is active and part of the cluster.
failed: the node is not reachable by the cluster.
leaving: a node is in the process of leaving the cluster.
left: the node has left the cluster.

In some embodiments, the administration API is an HTTP API available on each gateway node that allows the user to create, restore, update, and delete (CRUD) operations on items (e.g., plugins) stored in the data store. For example, the Admin API can provision APIs on a gateway node, provision plugin configuration, create consumers, and provision their credentials. In some embodiments, the administration API can also read, update, or delete the data. Generally, the administration API can configure a gateway node and the data associated with the gateway node in the data store.

Figure 4A:
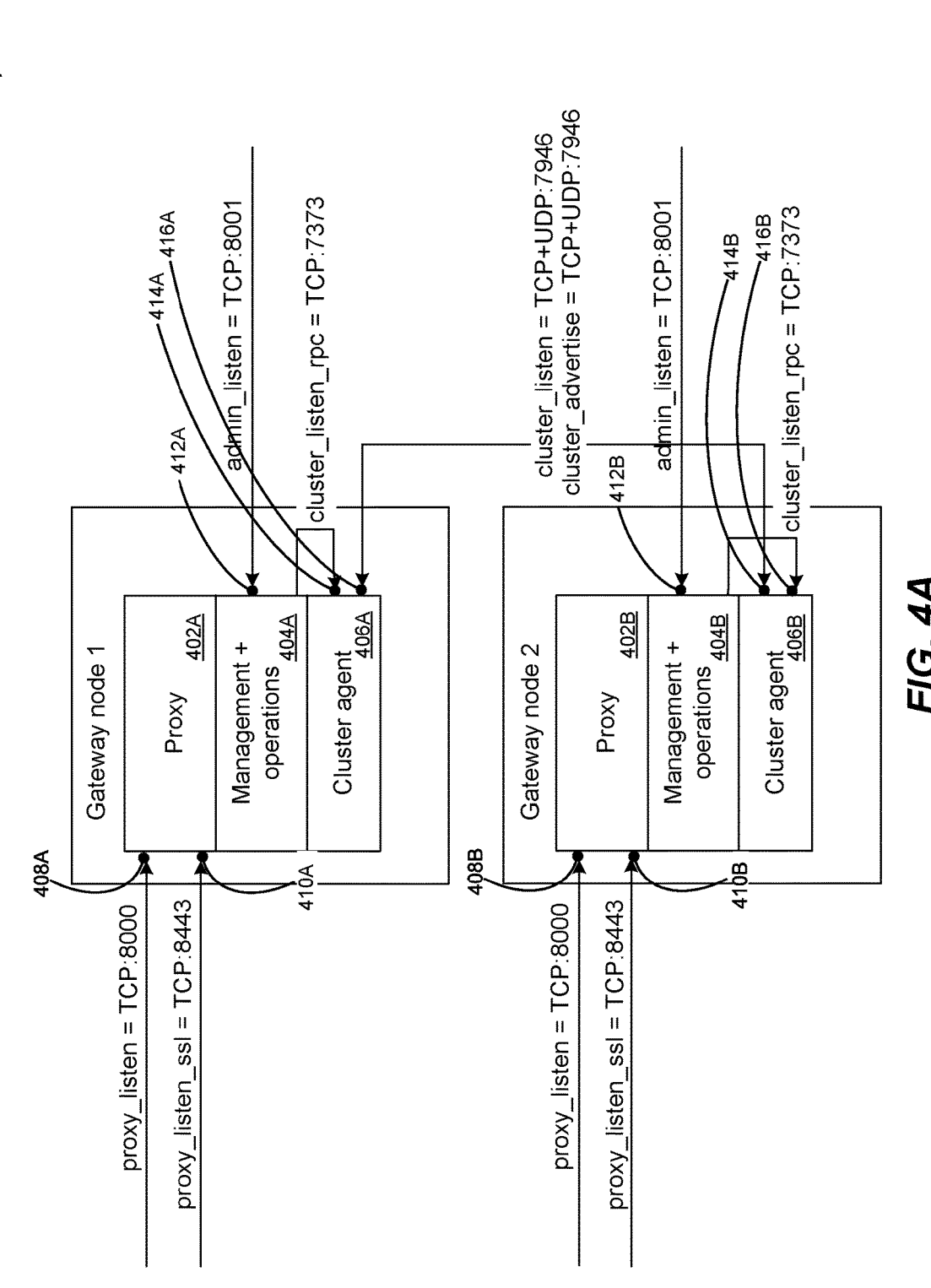
FIG. 4A and FIG. 4B illustrate example ports and connections of a gateway node, according to an embodiment of the disclosed technology.
Figure 4B:
Figure 4B:
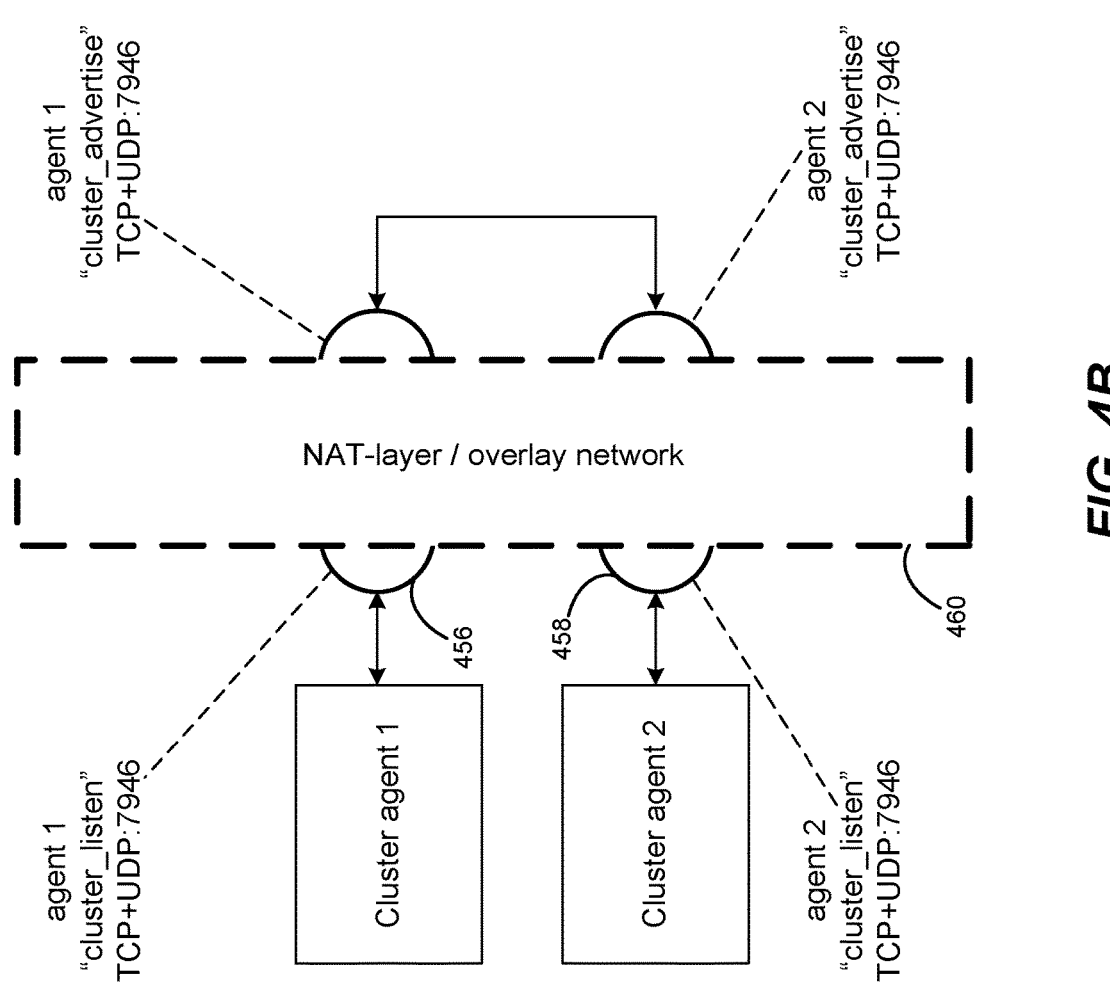

FIG. 4A and FIG. 4B illustrate example block diagrams 400 and 450 showing ports and connections of a gateway node, according to an embodiment of the disclosed technology. Specifically, FIG. 4A shows a gateway node 1 and gateway node 2. Gateway node 1 includes a proxy module 402A, a management and operations module 404A, and a cluster agent module 406A. Gateway node 2 includes a proxy module 402B, a management and operations module 404B, and a cluster agent module 406B. Gateway node 1 receive incoming traffic at ports denoted as 408A and 410A. Ports 408A and 410A are coupled to proxy module 402B. Gateway node 1 listens for HTTP traffic at port 408A. The default port number for port 408A is 8000. API-related requests are typically received at port 408A. Port 410A is used for proxying HTTPS traffic. The default port number for port 410A is 8443. Gateway node 1 exposes its administration API (alternatively, referred to as management API) at port 412A that is coupled to management and operations module 404A. The default port number for port 412A is 8001. The administration API allows configuration and management of a gateway node, and is typically kept private and secured. Gateway node 1 allows communication within itself (i.e., intra-node communication) via port 414A that is coupled to clustering agent module 406A. The default port number for port 414A is 7373. Because the traffic (e.g., TCP traffic) here is local to a gateway node, this traffic does not need to be exposed. Cluster agent module 406B of gateway node 1 enables communication between gateway node 1 and other gateway nodes in the cluster. For example, ports 416A and 416B coupled with cluster agent module 406A at gateway node 1 and cluster agent module 406B at gateway node 2 allow intra-cluster or inter-node communication. Intra-cluster communication can involve UDP and TCP traffic. Both ports 416A and 416B have the default port number set to 7946. In some embodiments, a gateway node automatically (e.g., without human intervention) detects its ports and addresses. In some embodiments, the ports and addresses are advertised (e.g., by setting the cluster_advertise property/setting to a port number) to other gateway nodes. It will be understood that the connections and ports (denoted with the numeral "B") of gateway node 2 are similar to those in gateway node 1, and hence is not discussed herein.

FIG. 4B shows cluster agent 1 coupled to port 456 and cluster agent 2 coupled to port 458. Cluster agent 1 and cluster agent 2 are associated with gateway node 1 and gateway node 2 respectively. Ports 456 and 458 are communicatively connected to one another via a NAT-layer 460. In accordance with disclosed embodiments, gateway nodes are communicatively connected to one another via a NAT-layer. In some embodiments, there is no separate cluster agent but the functionalities of the cluster agent are integrated into the gateway nodes. In some embodiments, gateway nodes communicate with each other using the explicit IP address of the nodes.

Figure 5:
FIG. 5 illustrates a flow diagram showing steps involved in the installation of a plugin at a gateway node, according to an embodiment of the disclosed technology.
Figure 5:
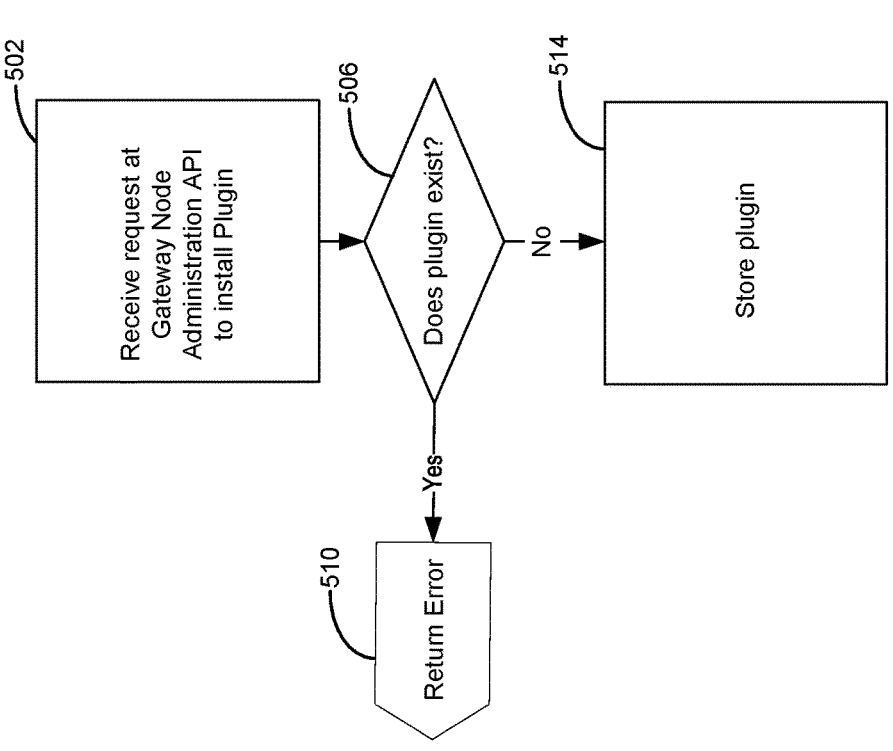

FIG. 5 illustrates a flow diagram showing steps of a process 500 involved in installation of a plugin at a gateway node, according to an embodiment of the disclosed technology. At step 502, the administration API of a gateway node receives a request to install a plugin. An example of a request is provided below:

For example:
    POST/plugins/install
    name=OPTIONAL VALUE
    code=VALUE
    archive=VALUE The administration API determines (at step 506) if the plugin exists in the data store via information over the hybrid websocket connection between the control plane (gateway CP on-prem, or cloud, the SaaS CP). If the node determines that the plugin exists in the data store, then the process returns (step 510) an error. If the node determines that the plugin does not exist in the data store, then the process stores the plugin. (In some embodiments, the plugin can be stored in an external data store coupled to the gateway node, a local cache of the node, or a third-party storage. For example, if the plugin is stored at some other location besides the data store, then different policies can be implemented for accessing the plugin.) Because the plugin is now stored in the database, it is ready to be used by gateway nodes in the cluster.

When a new API request goes through a gateway node (in the form of network packets), the gateway node determines (among other things) which plugins are to be loaded. Therefore, a gateway node sends a request to the data store to retrieve the plugin(s) that has/have been configured on the API and that need(s) to be executed. The gateway node communicates with the data store using the appropriate database driver (e.g., Cassandra or PostgresSQL) over a TCP communication. In some embodiments, the gateway node retrieves both the plugin code to execute and the plugin configuration to apply for the API, and then execute them at runtime on the gateway node (e.g., as explained in FIG. 6).

Figure 6:
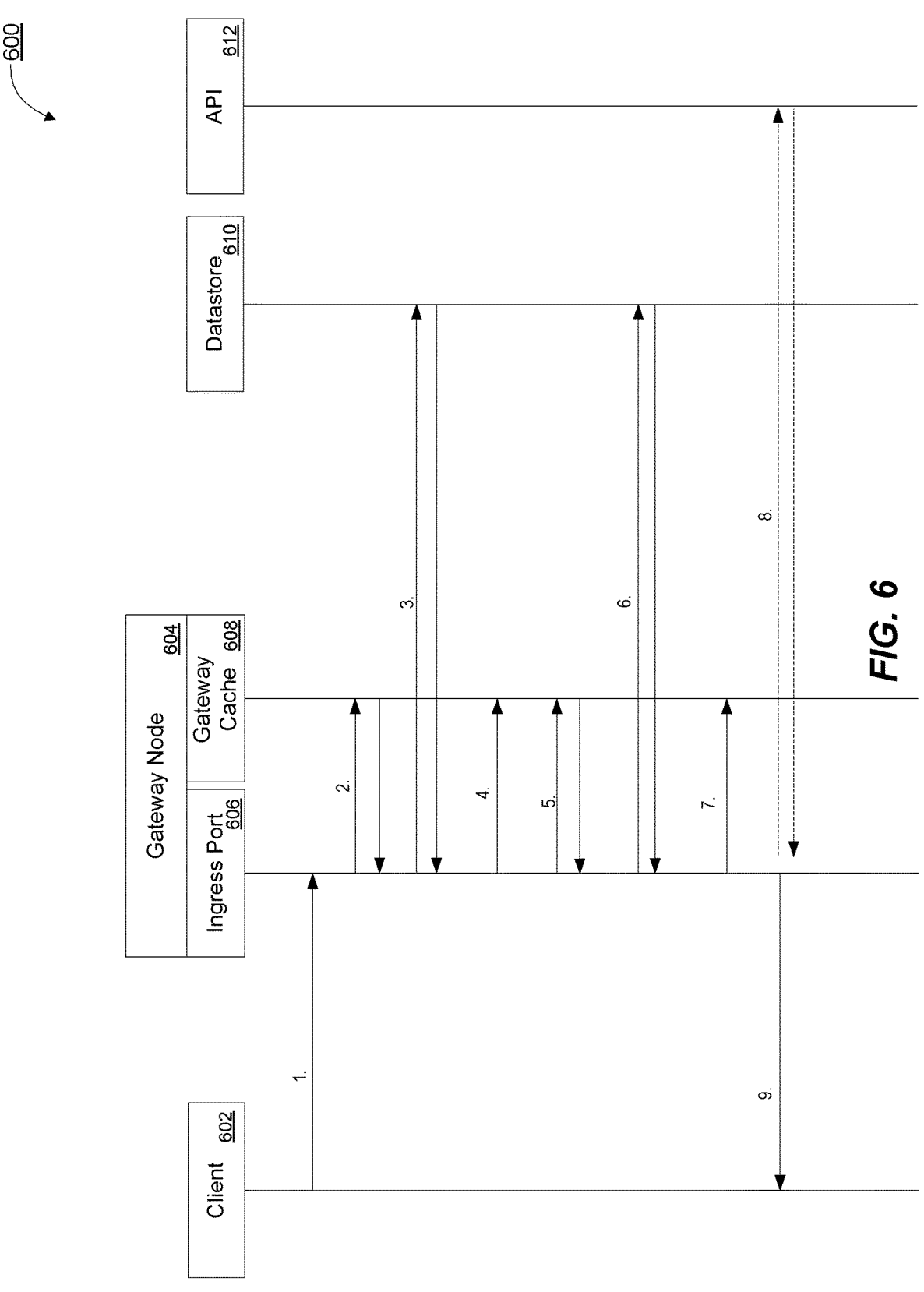
FIG. 6 illustrates a sequence diagram showing components and associated steps involved in loading configurations and code at runtime, according to an embodiment of the disclosed technology.

FIG. 6 illustrates a sequence diagram 600 showing components and associated steps involved in loading configurations and code at runtime, according to an embodiment of the disclosed technology. The components involved in the interaction are client 602, gateway node 604 (including an ingress port 606 and a gateway cache 608), data store 610, and an API 612. At step 1, a client makes a request to gateway node 604. At step 2, ingress port 606 of gateway node 604 checks with gateway cache 608 to determine if the plugin information and the information to process the request has already been cached previously in gateway cache 608. If the plugin information and the information to process the request is cached in gateway cache 608, then the gateway cache 608 provides such information to the ingress port 606. If, however, the gateway cache 608 informs the ingress port 606 that the plugin information and the information to process the request is not cached in gateway cache 608, then the ingress port 606 loads (at step 3) the plugin information and the information to process the request from data store 610. In some embodiments, ingress port 606 caches (for subsequent requests) the plugin information and the information to process the request (retrieved from data store 610) at gateway cache 608. At step 5, ingress port 606 of gateway node 604 executes the plugin and retrieves the plugin code from the cache, for each plugin configuration. However, if the plugin code is not cached at the gateway cache 608, the gateway node 604 retrieves (at step 6) the plugin code from data store 610 and caches (step 7) it at gateway cache 608. The gateway node 604 executes the plugins for the request and the response (e.g., by proxy the request to API 612 at step 7), and at step 8, the gateway node 604 returns a final response to the client.

Figure 7:
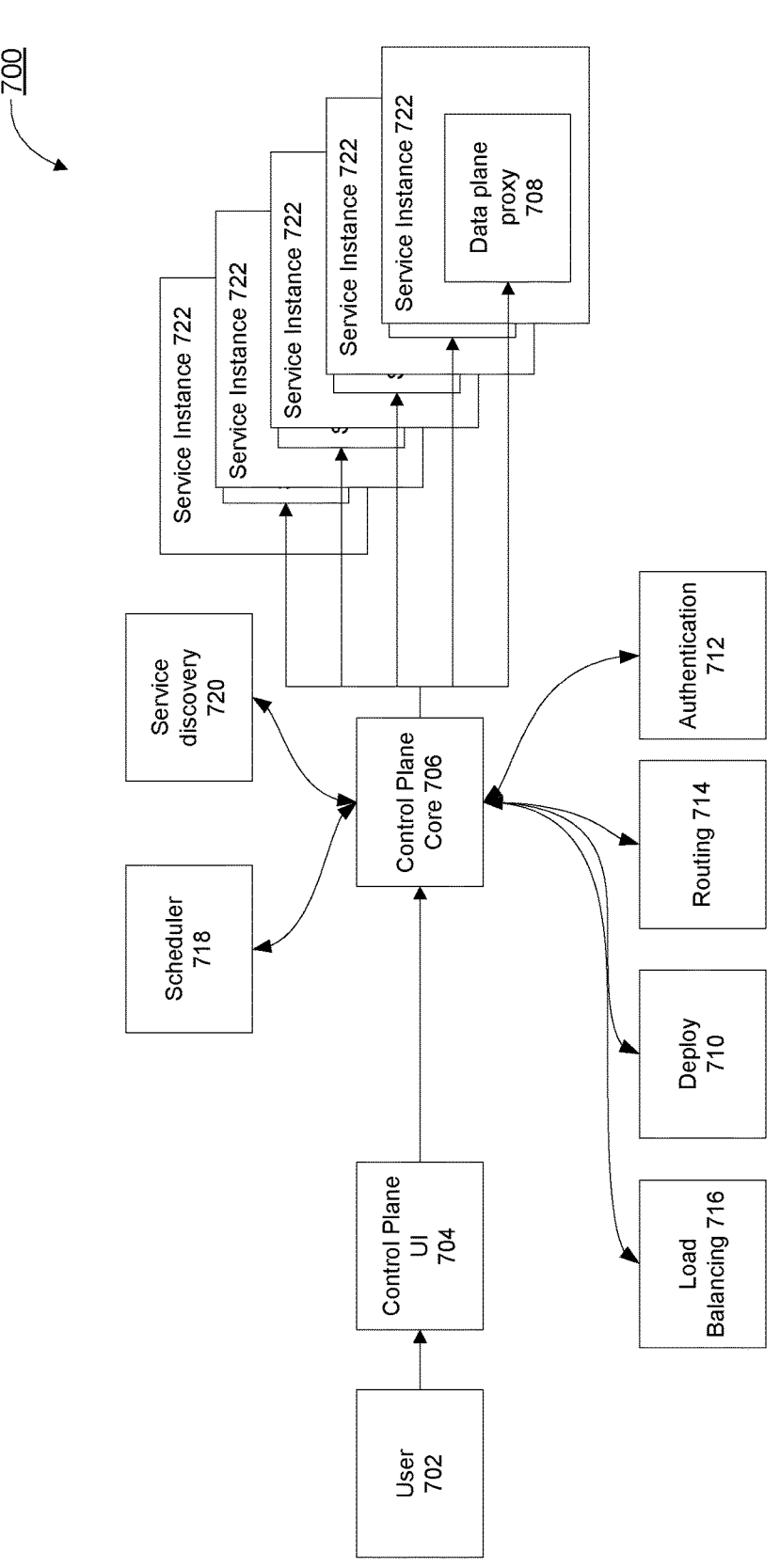
FIG. 7 is a block diagram of a control plane system for a service mesh in a microservices architecture.

FIG. 7 is a block diagram of a control plane system 700 for a service mesh in a microservices architecture. A service mesh data plane is controlled by a control plane. In a microservices architecture, each microservice typically exposes a set of what are typically fine-grained endpoints, as opposed to a monolithic application where there is just one set of (typically replicated, load-balanced) endpoints. An endpoint can be considered to be a URL pattern used to communicate with an API.

Service mesh data plane: Touches every packet/request in the system. Responsible for service discovery, health checking, routing, load balancing, authentication/authorization, and observability. In some embodiments, Envoy is the data plane technology that routes traffic. Services such as Kuma/Kong Mesh offered by the Applicant turns a set of Envoy data planes into a service mesh.

Service mesh control plane: Provides policy and configuration for all of the running data planes in the mesh. Does not touch any packets/requests in the system but collects the packets in the system. The control plane turns all the data planes into a distributed system.

A service mesh such as Linkerd, NGINX, HAProxy, Envoy co-locate service instances with a data plane proxy network proxy. Network traffic (HTTP, REST, gRPC, Redis, etc.) from an individual service instance flows via its local data plane proxy to the appropriate destination. Thus, the service instance is not aware of the network at large and only knows about its local proxy. In effect, the distributed system network has been abstracted away from the service programmer. In a service mesh, the data plane proxy performs a number of tasks. Example tasks include service discovery, health checking, routing, load balancing, authentication and authorization, and observability.

Service discovery identifies each of the upstream/backend microservice instances within used by the relevant application. Health checking refers to detection of whether upstream service instances returned by service discovery are ready to accept network traffic. The detection may include both active (e.g., out-of-band pings to an endpoint) and passive (e.g., using 3 consecutive $5xx$ as an indication of an unhealthy state) health checking. The service mesh is further configured to route requests from local service instances to desired upstream service clusters.

Load balancing: Once an upstream service cluster has been selected during routing, a service mesh is configured load balance. Load balancing includes determining which upstream service instance should the request be sent; with what timeout; with what circuit breaking settings; and if the request fails should it be retried?

The service mesh further authenticates and authorizes incoming requests cryptographically using mTLS or some other mechanism. Data plane proxies enable observability features including detailed statistics, logging, and distributed tracing data should be generated so that operators can understand distributed traffic flow and debug problems as they occur.

In effect, the data plane proxy is the data plane. Said another way, the data plane is responsible for conditionally translating, forwarding, and observing every network packet that flows to and from a service instance.

The network abstraction that the data plane proxy provides does not inherently include instructions or built in methods to control the associated service instances in any of the ways described above. The control features are the enabled by a control plane. The control plane takes a set of isolated stateless data plane proxies and turns them into a distributed system.

A service mesh and control plane system 700 includes a user 702 whom interfaces with a control plane UI 704. The UI 704 might be a web portal, a CLI, or some other interface. Through the UI 704, the user 702 has access to the control plane core 706. The control plane core 706 serves as a central point that other control plane services operate through in connection with the data plane proxies 708. Ultimately, the goal of a control plane is to set policy that will eventually be enacted by the data plane. More advanced control planes will abstract more of the system from the operator and require less handholding.

control plane services may include global system configuration settings such as deploy control 710 (blue/green and/or traffic shifting), authentication and authorization settings 712, route table specification 714 (e.g., when service A requests a command, what happens), load balancer settings 716 (e.g., timeouts, retries, circuit breakers, etc.), a workload scheduler 718, and a service discovery system 720. The scheduler 718 is responsible for bootstrapping a service along with its data plane proxy 718. Services 722 are run on an infrastructure via some type of scheduling system (e.g., Kubernetes or Nomad). Typical control planes operate in control of control plane services 710-720 that in turn control the data plane proxies 708. Thus, in typical examples, the control plane services 710-720 are intermediaries to the services 722 and associated data plane proxies 708.

As depicted in FIG. 7, the control plane core 706 is the intermediary between the control plane services 710-720 and the data plane proxies 708. Acting as the intermediary, the control plane core 706 removes dependencies that exist in other control plane systems and enables the control plane core 706 to be platform agnostic. The control plane services 710-720 act as managed stores. With managed storages in a cloud deployment, scaling and maintaining the control plane core 706 involves fewer updates. The control plane core 706 can be split to multiple modules during implementation.

The control plane core 706 passively monitors each service instance 722 via the data plane proxies 708 via live traffic. However, the control plane core 706 may take active checks to determine the status or health of the overall application.

The control plane core 706 supports multiple control plane services 710-720 at the same time by defining which one is more important through priorities. Employing a control plane core 706 as disclosed aids control plane service 710-720 migration. Where a user wishes to change the control plane service provider (ex: changing service discovery between Zookeper based discovery to switch to Kong Mesh based discovery), a control plane core 706 that receives the output of the control plane services 710-720 from various providers can configure each regardless of provider. Conversely, a control plane that merely directs control plane services 710-720 includes no such configuration store. Service discovery collects data from each implemented service and deposits into an unsorted list of service data. The unsorted list is subsequently sorted into registered service hub services.

Another feature provided by the control plane core 706 is Static service addition. For example, a user may run Kong Mesh, but you want to add another service/instance (ex: for debugging). The user may not want to add the additional service on the Kong Mesh cluster. Using a control plane core 706, the user may plug the file-based source with custom definition multi-datacenter support. The user may expose the state hold in control plane core 706 as HTTP endpoint, plug the control plane core 706 from other datacenters as a source with lower priority. This will provide fallback for instances in the other datacenters when instances from local datacenter are unavailable.

Service Hub

Figure 8:
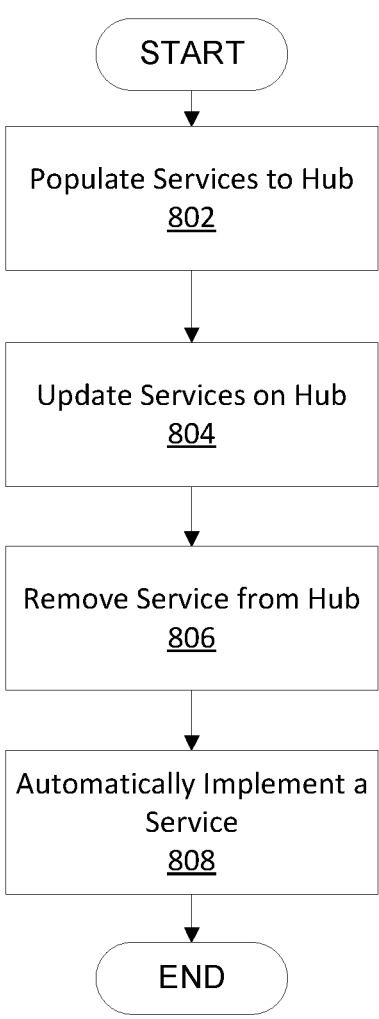
FIG. 8 illustrates a flow diagram showing steps involved in management of a service in a service hub catalog or registry.

FIG. 8 illustrates a flow diagram showing the steps involved in management of a service in a service hub catalog or registry. In step 802, services are populated to the hub. Population of services occurs via manual upload or through automatic population. Manual upload function adds a service to the Catalog. Using a navigation menu, a user activates an Add New Service and enters a Service Name. A Service name can be any string containing letters, numbers, or characters; for example, service_name, Service Name, or Service-name. The user then enters a Version Name. A version name can be any string containing letters, numbers, or characters; for example, 1.0.0, v.1, or version #1. A service can have multiple versions. The user may then enter a description and complete creation. A new Service is created and the connected cloud service hub automatically redirects to the service's overview page. These actions are accessible through the UI or via API In some embodiments, the add function is directed to an application architecture and each service within the application is automatically populated into the service hub registry. Metadata for each service (e.g., name, version, etc.) is extracted from connected service documentation.

Addition of a service to the registry additionally stores the codebase of that service or provides a link/reference to the codebase which scans and cache key metadata. The code available at the Service Hub enables subsequent implementation from the Service Hub.

In step 804, a user activates an Update function for a service already within the registry. Similarly, a user may update manually or through automatic population. To perform a manual update, from a navigation menu, a user clicks services and selects a service from a displayed list. The user is enabled to edit the Service name and description directly on that page.

In some embodiments, the update function is directed to an application architecture that was previously registered, and each service in the registry is automatically updated. The update process parses the service documentation and makes changes based on changed to the documentation. Where new services have been present since a previous update or add, those new services are added to the registry as in the same manner as step 802. In some cases, the update generates a new version of a given service that is sorted/indexed separately in the Service Hub registry. In some embodiments, the indexing of multiple versions of a similar service are grouped together such that a user navigates to the service name, and from the service name navigates further to a version or implementation.

In step 806, a user activates a delete function for a service already within the registry to remove that service. From a Hub navigation menu, selects a service from the list and operates a user interface function to delete a chosen service. After a confirmation to delete, the Service Hub removes the selected service from the registry.

In step 808, a user implements a given service from the registry. From the Service Hub navigation, a user identifies a given service to implement and where to implement that service (e.g., at an API gateway, or added to a runtime group or a service group). The user enters the connection details for the upstream service (e.g., a URL, Protocol, Host and Path). For Path(s), click Add Path and enter a path in the format /<path>. In some embodiments, the implementation is further customizable via parameter descriptions.

A runtime group is effectively a virtual (SaaS) control plane for an API Gateway. The runtime group allows a group of gateway data planes to share a common configuration that's fully isolated from other runtime Groups. The Konnect platform allows users to define more than one runtime group. Definition of multiple groups allows logical business separation (multiple line of businesses can each have their own fully-isolated gateway configuration) as well as environment isolation (development, testing, production), and mixed (marketing-dev, marketing-prod, sales-dev, sales-prod).

A service group is a group of services that together perform an identifiable application purpose or business flow. For example, a set of microservices are responsible for an airline's ticketing portion of their website as opposed to the overall application (ex: whole website). Other examples may include "customer experience," "sign up," "login," "payment processing", etc.

After the connection details are received, the service hub requests a route for the implementation. A user can accept the defaults, or further customize their route. While creating an implementation, a user indicates only a single route. Where the service version makes use of more routes, the user adds those routes to the version after creating the first route.

Once complete, the Service Hub automatically implements the service from the codebase stored with the registry. The service version's overview page further automatically updates with a new record for status code indicating the new implementation.

Figure 9:
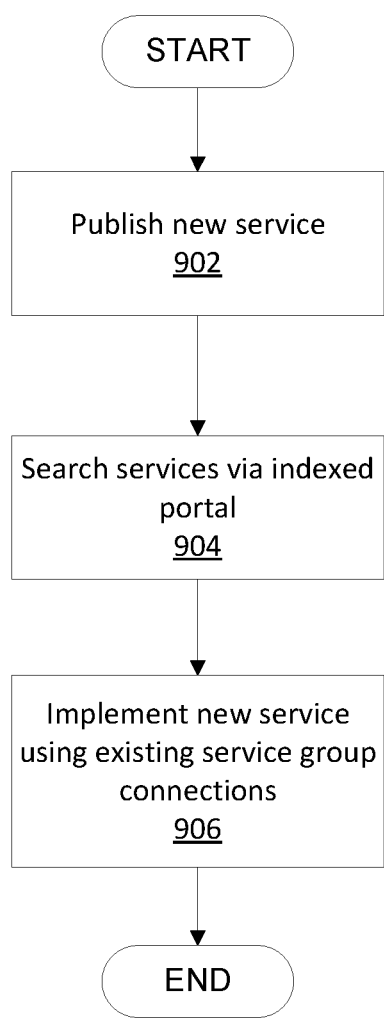
FIG. 9 illustrates a flow diagram showing steps involved in publishing a service to a service hub.

FIG. 9 illustrates a flow diagram showing the steps involved in publishing a service to a service hub. In step 902, a user seeks to publish a new service to the Dev Portal to expose that service to application developers. Through a ServiceHub, users are enabled to publish any service in an application catalog and its respective documentation to a developer portal. Once a service is published to the service hub, other developers with access to the developer portal have access to consume the service with a few clicks.

Typically, different runtime groups or service groups have many similar functions in addition to a core service. The core service(s) may vary from runtime group to runtime group (or service group), but many features remain the same, such as authentication, and logging, and rate management. There are additionally less common/uncommon services that are nevertheless copied between services groups such as payment processing or image hosting.

Developers save time by being able to consume services from the developer portal. In step 904 a developer searches the developer portal using indexed search on the existing published services. Indexing on the services is performed via documentation or description thereof.

Once identified, in step 906, the developer indicates the runtime/service group in which the new service should be implemented by linking the inputs and outputs of the service to the runtime/service group and executing a request to implement the new service.

Figure 10:
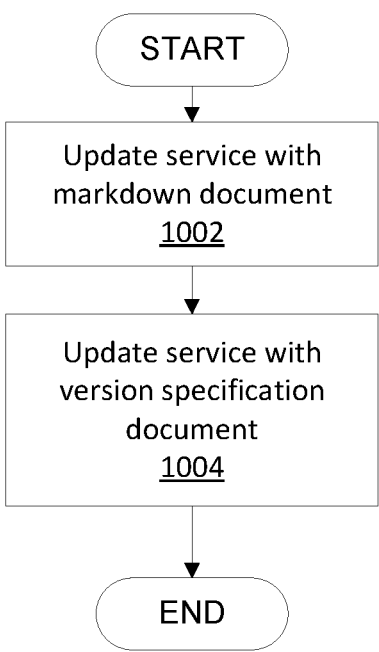
FIG. 10 illustrates a flow diagram showing steps involved in updating a service documentation in a developer portal.

FIG. 10 illustrates a flow diagram showing the steps involved in updating a service documentation in a developer portal. Users are enabled to upload Service descriptions and version specs. Recommend use includes uploading an API spec for each Service version. After adding documentation for your Services, publish them to the Dev Portal.

Descriptions provide extended descriptions of the published Services. The description applies to the whole Service and appears on every version of that Service in the Dev Portal. The description enables indexing for a dev portal search engine of services.

In step 1002, to update a service, the user uploads a new Markdown document to an existing service entry in the service hub. Upon upload a new version of the existing service is generated and users are enabled to implement the new version (as well as the old version).

Upon creation of a new version, in step 1004, a spec document is additionally uploaded to further define the version. Example formats of the specification document include AsyncAPI or OpenAPI (Swagger) specs in YAML or JSON format.

If the Service was previously published to the Dev Portal, the documentation for the Service gets automatically updated with your changes. If not, publish the Service.

IPFS

In some embodiments, the API gateway is further enabled to execute a network of distributed file sharing. Typically, InterPlanetary File Systems (IPFS) operate on a protocol of peer-to-peer distribution similar to a torrent system. IPFS aims to create a single global network. For example, where two users publish a block of data with a matching hash, the peers downloading the content from "user 1" will also exchange data with the ones downloading it from "user 2". IPFS aims to replace protocols used for static webpage delivery by using gateways which are accessible with HTTP.

Other systems that seek to make use of IPFS are required to proxy traffic through an IPFS node. An API gateway can replace the proxied traffic and insert itself as a node in the IPFS network. The API gateway maps the existing files on a given microservices application and provides internal routing and file availability of those files. IPFS operates using a hash of the data blocks, and the API gateway is configured to generate those hashes and present them to the greater IPFS network.

By operating the API gateway as a node in the IPFS network, a notable amount of proxied traffic is reduced and removed from a microservices application's total traffic. Such action frees up additional bandwidth for other operation.

Service Hub Discovery

Figure 11:
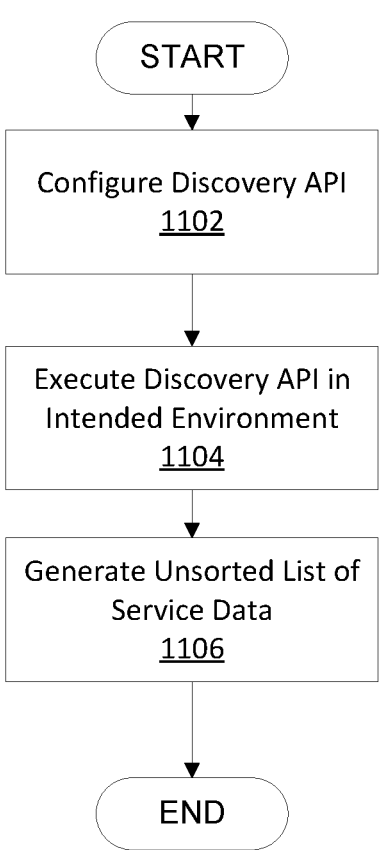
FIG. 11 illustrates a flow diagram showing steps involved with a discovery API that populates an unsorted service description list.

FIG. 11 illustrates a flow diagram showing steps involved with a discovery API that populates an unsorted service description list. Large microservice applications tend to make use of many services and deployments. Not all deployments are necessarily communicatively connected to the control plane. Thus, data from data plane proxies is not necessarily available. Discovery of services inherently becomes more complicated. To solve for service discovery, a discovery API implemented in a given deployment generates the service e discovery data.

In step 1102, a discovery API is configured for a predetermined deployment environment. The environment the discovery API operates in influences how the discovery API operates. Some environments are execution environments, such as host servers and cloud environments. For example, Microsoft Azure, Google Cloud, Amazon Web Services, etc. Other environments are repositories for source code and documentation. For example, GitHub.

In step 1104, based on the style of deployment, the discovery API executes in the corresponding environment. When the deployment environment is a code repository, the discovery API extracts data from each of the services as organized in the repository by file folder structure/hierarchy. When the deployment environment is an execution environment, the discovery API establishes a network of proxied traffic collection to each of the services executing in the environment and performs service discovery (as described in other locations herein).

In step 1106, the discovery API generates an unsorted list of service data pertaining to each of the services available within the deployment. The data gathered from the deployment is deposited into an unsorted list. The unsorted list of services is unsorted in the sense the listed services are not included in the service hub directory. In some embodiments, the implementation function of the service hub is not available from the unsorted list. While the unsorted list of services is unsorted with respect to the service hub directory, the service data is sorted by service. The initial title of the service is based on either the file structure title in a code repository, or self-designation based on data layer traffic.

The amount of data for each service in the unsorted list varies based on the observed portions of the data. For example, a source code repository provides full access to the code and documentation. Utilizing development environment tools and/or generative AI and/or natural language processing analysis of the code and documentation provides a reasonably complete unsorted record of the service. Elements missing are those that may not typically be included with a source code repository, e.g., a team personnel listing and active projects associated with the code.

In an execution environment, the unsorted record of the service is based on traffic to and from the service. Traffic typically captures input and output variables, arrangement with other services, and output transformation based on input variables. The same sort of analysis may be applied to the data plane traffic observations as with access to the source code repository with the acknowledgment that the input to the analysis is different, and the analysis is correspondingly different. The discovery API is configured for each environment individually and a different discovery API is deployed based on the environment analyzed.

Figure 12:
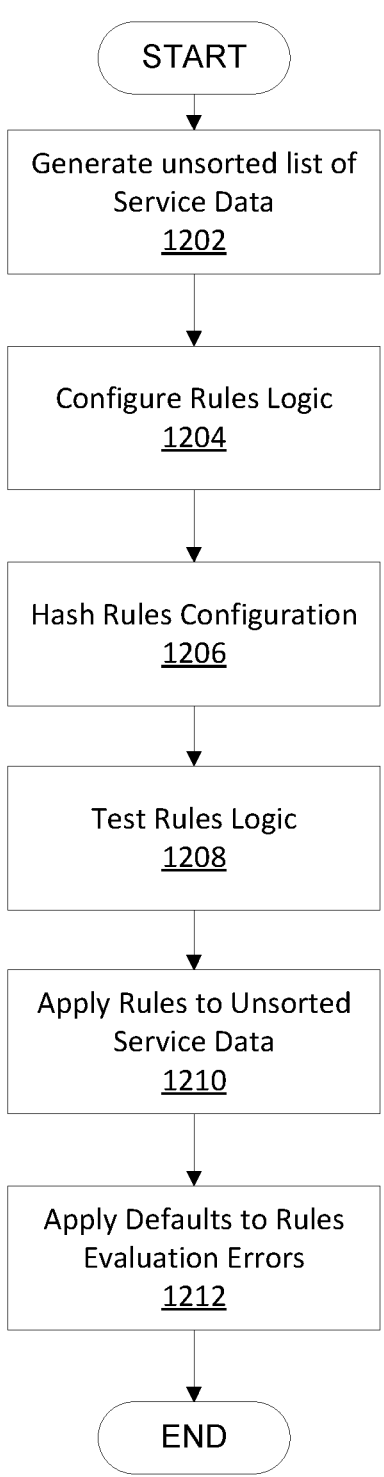
FIG. 12 illustrates a flow diagram showing steps involved with application of rules to unsorted service descriptions.

FIG. 12 illustrates a flow diagram showing steps involved with application of rules to unsorted service descriptions. It is cumbersome to manually review and act on every discovery suggestion for large organizations with many services and deployments. The default matching behavior for discovery suggestions might be insufficient for a customer's needs. Accordingly, the service hub system allows customers to configure flexible rules per-integration that govern the behavior of service discovery for that integration. The result of the method is to provide sorting recommendations for the unsorted list to integrate the service data into a service hub directory with the advantages the service hub provides.

A user may accept the recommendation and the integration into the service hub directory happens automatically according to the pre-sorting. Alternatively, in some circumstances, where some pre-sorting rules are met, a user is not required to confirm the sorting, and sorting into the service hub directory is performed automatically without further intervention.

In step 1202, an unsorted list of service data is filled up via any of the methods described herein (e.g., control plane service discovery or discovery API operation). In step 1204, an administrator configures a set of rules to pre-sort the unsorted list. An ingestion rule consists of: Selector Expression, Action, ID/Name, and Priority.

The ID and name fields are used to correlate the rule with any stateful changes the rule has caused. For example, if a rule automatically accepts a suggestion, the discovery activity entry will show the rule as the actor instead of a specific user.

The priority is applied for ordering. A user can configure multiple rules to apply to a single suggestion. When order of operations is guaranteed, the user has more flexibility when setting up custom discovery logic. For example, a "catch-all" rule can be configured to execute last. This rule could automatically ignore a suggestion that was not matched by a previous rule to prevent clutter from being ingested into the system.

A Selector Expression is an evaluator, such as a JQ expression that evaluates to a Boolean value. The input to the JQ expression is a json object submitted by the integration when ingesting a discovery suggestion.

An action is what the recommendation is based on evaluation of the selector expression. An action is invoked when a selector expression matches a discovery suggestion. Based on type, the action can mutate or act on the suggestion. Each ingestion rule has a corresponding action. In some embodiments each ingestion rule cannot have more than 1 action. Below are illustrative examples of actions:

Auto-Ignore

This is the simplest action type. This action can be configured to any rule regardless of the scope (i.e., service or deployment) of the integration binding. When configured for an ingestion rule, the matched suggestion will be automatically ignored when the action is invoked.

Upsert Service

This action can only be configured for integration bindings that ingest service-scoped discovery suggestions (ex: PagerDuty Services). When configuring the Upsert service action, the user is enabled to set the field values of the Service. These values are then used for determining if the Service already exists in Service Hub and/or populating field values when creating a new Service. The existence of the Service dictates the action suggested (same rules detailed in Integration-Driven Discovery).

A useful element of the upsert service action is that the user is enabled to use template strings interpolated with JQ expressions for these field values. The input to the JQ expressions are the integration_record object. JQ expressions are denoted using double-curly bracket syntax, e.g.,

```
{
    "name": "some-prefix-{{ .pd_service.name | ascii_downcase }}"
}
```

Examples of Service field values that are configurable based on the Upsert Service action include any of: ID, Name, Display Name, Description, Version, or Labels. Of the above, only Name is a required field. From the above list of fields, the following will be used as existence checks to determine if a Service is already cataloged and can be mapped to: ID, Name.

Upsert Deployment

The Upsert Deployment action is configured for integration bindings that ingest deployment-scoped discovery suggestions (ex: Runtime Manager Gateway Services). As part of this action config, the customer can select whether they want the suggestion to be auto accepted as part of the action invocation.

When configuring this action, the user is enabled to set the field values of both the Service and Deployment. These values are then used for: determining if the Service and/or Deployment already exist in Service Hub and/or populating field values when creating either a new Service or Deployment. The existence of the Service and Deployment dictates the action suggested (same rules detailed in Integration-Driven Discovery).

A useful element of the Upsert Deployment action is that the user is enabled to use template strings interpolated with JQ expressions for these field values. The input to the JQ expressions are the integration_record object. JQ expressions are denoted using double-curly bracket syntax. For example:

```
{
    "name": "{{ .gateway_service.name }}-{{ .runtime_group.name }}"
}
```

The Service field values that can be configured as part of the Upsert Deployment rule action are the same fieldset listed in the Upsert Service action. Furthermore, the fields used for Service existence checks are also the same.

In an additional illustrative example, an action may tag a given set of service data. The tag is then used by other rules, or for review by a administer user.

Adding the rules engine to discovery settings presents a chicken and egg problem. Preferably, the platform keeps discovery enabled by default for (most) integrations. Meanwhile, the asynchronous discovery process will start to ingest suggestions as soon as the user installs/enables an integration. The result is that a customer might have hundreds of suggestions ingested with the default discovery behavior prior to configuring their ingestion rules.

In step 1206, to improve rules generation, the rules engine stores a hash of the rules configuration. When the hash changes, the rules engine asynchronously re-runs ingestion logic against any existing suggestions that have yet to be acted on. Any ingestion rules configuration will then be applied (see step 1208), reducing toil for the user.

In step 1208, the rules engine enables a rule test function. Users are enabled to test their rules against different integration_record objects without consequence. This type of capability goes hand-in-hand when users have the ability to use templated expressions. An example of consequence-less rule tests from another platform is testing notifications when configuring DataDog monitors.

To achieve consequence-less tests, integrations that support discovery declare an example integration_record payload as part of their manifest. When creating or editing a rule, this payload is rendered by the UI in an editable JSON viewer.

Furthermore, a "Test Rule" call to action is presented to the user in the graphic user interface. This button triggers an API request to a dedicated route for testing the behavior of a rule against the current service/deployment state of the customer's Service Hub without mutating any state.

The user then tests/debugs their JQ expressions against different integration_record representations and see how the rule would affect their Service Hub against live service/deployment data.

In step 1210, The unsorted list of service data is subjected to the preconfigured rules. As the recommendation is being built by the rules, the recommendations generate a new property in the API that is referred to as integration_record. The Runtime Manager integration can leverage the new property to submit additional context about the entities that are bound to a Service Hub deployment.

A Selector Expression evaluates to true for the rule to match the suggestion. The following expression evaluations will result in no match: false, non-Boolean value, Error thrown, and Timeout. When there is no match, the next configured rule's selector expression will be evaluated with the given suggestion, or, if there are no more configured rules, we'll fallback to the default discovery behavior.

When a match occurs, the action configured for the ingestion rule will be invoked. Some possible selector expressions users might configure:

.gateway_service.tags[ ]|contains("_KonnectService:")

The above expression evaluates to true only when the Gateway Service associated with the suggestion has a tag containing the string "_KonnectService:". Where the example suggestion evaluates to true, any actions associated to this rule would be invoked.

.runtime_group.name=="Test" or (.gateway_service.en-abled|not)

The above expression evaluates to true when the Runtime Group name is "Test" or when the Gateway Service is disabled.

Evaluation errors (i.e. syntax, type error, timeout, etc) can occur when the rules invoke an action as a result of evaluating user-provided JQ expressions. When an error occurs, the recommendation breaks from the rules engine logic entirely and fallback to the default discovery logic. The platforms the fall back because a Selector Expression has already successfully matched the suggestion (e.g., Boolean evaluated as True). Therefore, continuing to the next configured ingestion rule could result in unintended side-effects that are more frustrating for the user to resolve.

Below is a Runtime Manager integration example:
With respect to a Selector Expression

```
{
    "scope": "deployment",
    "deduplication_id":  "b58394f8-2ae8-443a-845c-
1c7374a72b4e+db43e8cb-0101-4e48-b8a1-02282e73242a",
    "suggested_service_name": "billing",
    "suggested_deployment_name": "billing-production",
    "data": {
        "runtime_group_id": "b58394f8-2ae8-443a-845c-1c7374a72b4e",
        "gateway_service_id": "db43e8cb-0101-4e48-b8a1-02282e73242a"
    },
    "integration_record": {
        "runtime_group": {
            "id": "b58394f8-2ae8-443a-845c-1c7374a72b4e",
            "name": "Production",
            "labels": {
                "env": "prod"
            },
            "created_at": "2022-06-03T07:20:50Z",
            "updated_at": "2023-01-21T17:20:12Z"
        },
        "gateway_service": {
            "id": "db43e8cb-0101-4e48-b8a1-02282e73242a",
            "name": "billing",
            "enabled": true,
            "host": "example.com",
            "path": "/billing",
            "tags": "_KonnectService:billing",
            "created_at": "2022-07-10T07:20:50Z",
            "updated_at": "2022-11-28T17:20:12Z"
        }
    }
}
```

With respect to the actions

```
{
    "type": "upsert_deployment",
    "auto_accept": true,
    "service": {
        "id": null,
        "name": "{{ .gateway_service.name }}",
        "display_name":  "{{ .gateway_service.tags[ ]  |
select(contains(\"_KonnectService:\"))  1 split(\":\") | .[1] }}",
        "description": null,
        "labels": null
    },
    "deployment": {
        "id": null,
        "name": "{{ .gateway_service.name }}-{{
.runtime_group.labels.env }}",
        "display_name": "{{ .runtime_group.name }}",
        "description": null,
        "labels": {
            "env": "{{ .runtime_group.labels.env }}",
            "rg_id": "{{ .runtime_group.id }}"
        }
    }
}
```

The above action example derives the Service name and display name from the Gateway Service name and _KonnectService: tag respectively. The action derives the Deployment name and display name using a combination of data available from the Runtime Group and Gateway Service objects within the integration_record payload. Additionally, the action sets labels on the Deployment based on information from the Runtime Group. Finally, suggestions that invoke this action will automatically be accepted because auto_accept is set to true.

In step 1212, the rules engine enables associating errors to suggestions. When an error occurs evaluating a JQ expression, the platform breaks out of the ingestion rules engine and reverts to the default discovery behavior of creating a new discovery suggestion. From a user's perspective, their rules configuration is not working as expected and they can only guess as to why.

The platform improves the experience by giving the user some visibility into why their rules did not work as expected. When an evaluation error (syntax, timeout, etc. . . . ) occurs, the platform persists some error context and associate it to the suggestion created by the default discovery behavior. When viewing the suggestion, a user is able to see in the graphic user interface that a given element went wrong while trying to apply a given ingestion rule.

Figure 13:
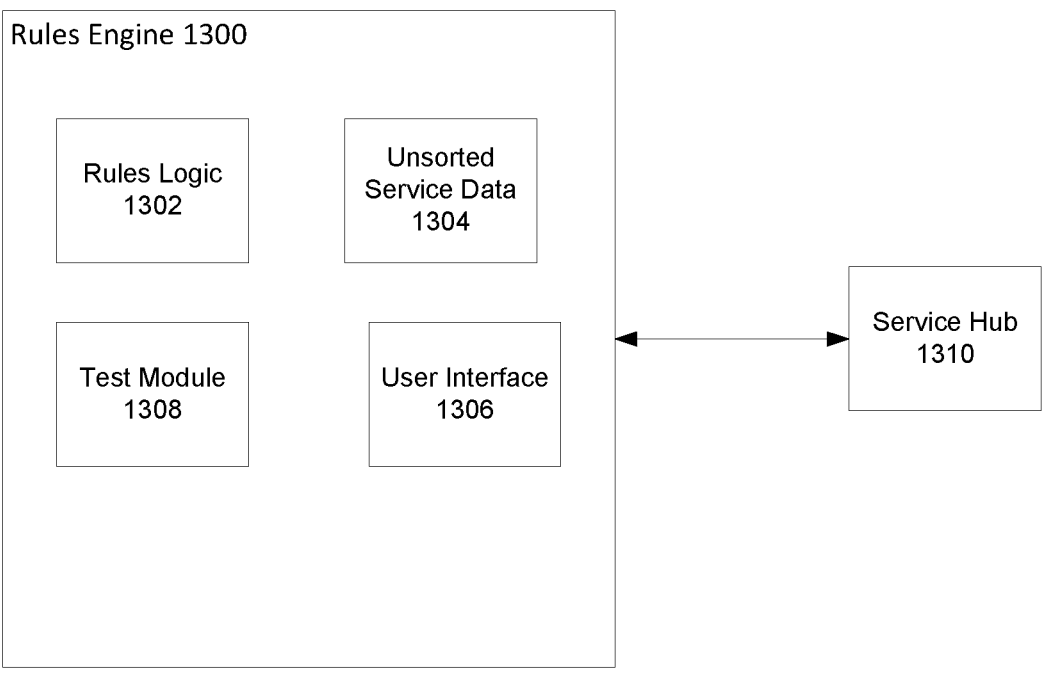
FIG. 13 illustrates a block diagram of a rules engine.

FIG. 13 illustrates a block diagram of a rules engine. The rules engine 1300 includes rules logic 1302, an unsorted list of service data 1304, a user interface 1306, and a test module 1308. The rules engine 1300 is communicatively connected to the service hub 1310. Users generate, modify and test rules via the user interface 1306. The user interface 1306 further enables subsequent affirmation of the outcome of the application of rules.

Exemplary Computer System

Figure 14:
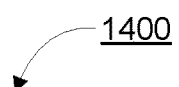
FIG. 14 depicts a diagrammatic representation of a machine in the example form of a computer system within a set of instructions, causing the machine to perform any one or more of the methodologies discussed herein, to be executed.
Figure 14:
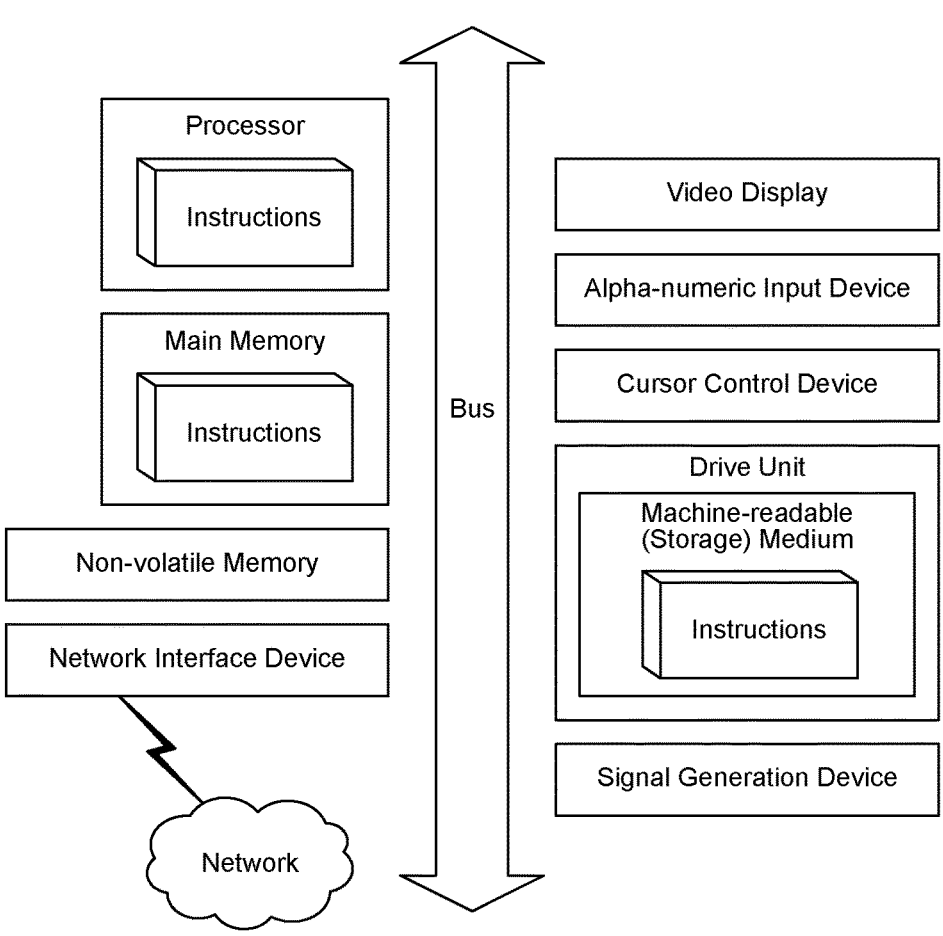

FIG. 14 shows a diagrammatic representation of a machine in the example form of a computer system 1400, within which a set of instructions for causing the machine to perform any one or more of the methodologies discussed herein may be executed.

In alternative embodiments, the machine operates as a standalone device or may be connected (networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone or smart phone, a tablet computer, a personal computer, a web appliance, a point-of-sale device, a network router, switch or bridge, or any machine capable of executing a set of instructions (sequential or otherwise) that specify actions to be taken by that machine.

While the machine-readable (storage) medium is shown in an exemplary embodiment to be a single medium, the term "machine-readable (storage) medium" should be taken to include a single medium or multiple media (a centralized or distributed database, and/or associated caches and servers) that store the one or more sets of instructions. The term "machine-readable medium" or "machine readable storage medium" shall also be taken to include any medium that is capable of storing, encoding or carrying a set of instructions for execution by the machine and that cause the machine to perform any one or more of the methodologies of the present invention.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine or computer-readable media include, but are not limited to, recordable type media such as volatile and non-volatile memory devices, floppy and other removable disks, hard disk drives, optical disks (e.g., Compact Disk Read-Only Memory (CD ROMS), Digital Versatile Discs, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

All patents, applications and references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for.") Accordingly, the applicant reserves the right to add additional claims after filing the application to pursue such additional claim forms for other aspects of the disclosure.

The invention claimed is:

1. A method of operating a microservices registry hub that automatically discovers and sorts services:

establishing a microservice architecture application including a plurality of services, the plurality of services are each an application program interface (API) performing a piecemeal function of an overall application function;

storing, via the microservices registry hub, an index of the plurality of services, wherein the microservices registry hub is configured to implement services of the plurality of services to execution environments;

generating a list of unsorted service data associated with a first service of the plurality of services available within a predetermined environment, wherein said generating the list of unsorted service data comprises deploying a discovery API that observes the first service available within the predetermined environment, and wherein the predetermined environment is an execution environment wherein the first service available within the predetermined environment is executing;

automatically pre-sorting the list of unsorted service data based on a predetermined set of heuristic rules based on the index of the plurality of services;

in response to a user confirmation, updating the index of the plurality of services based on the pre-sorting; and reporting, by the discovery API to the microservices registry hub, data plane service traffic generated by the first service available within the predetermined environment, wherein the list of unsorted service data is based on the data plane service traffic.

2. The method of claim 1, wherein the predetermined environment comprises a control plane that is communicatively connected to a plurality of data plane proxies associated with the first service and said generating the list of unsorted service data includes:

receiving, at a microservice control plane, proxied data plane service traffic from the first service; and reporting, by the control plane to the microservices registry hub, the proxied data plane service traffic generated by the first service available within the predetermined environment, wherein the list of unsorted service data is based on the proxied data plane service traffic.

3. The method of claim 1, wherein the index of the plurality of services includes, for each service, any of:

a name;

a specification;

a version history;

a list of instances;

configuration data associated with any of versions or instances; or functional runtime group data.

4. The method of claim 1, wherein the user confirmation is configured to auto confirm a first pre-sorted service entry based on the first pre-sorted service entry matching a first rule of the predetermined set of heuristic rules.

5. A method of operating a microservices registry hub that automatically discovers and sorts services:

establishing a microservice architecture application including a plurality of services, the plurality of services are each an application program interface (API) performing a piecemeal function of an overall application function;

storing, via the microservices registry hub, an index of the plurality of services, wherein the microservices registry hub is configured to implement services of the plurality of services to execution environments;

scraping, by a discovery API to the microservices registry hub, source code and documentation associated with a first service of the plurality of services available within a predetermined environment, wherein the predetermined environment is a source code repository wherein the source code and the documentation associated with the first service available within the predetermined environment is stored, and wherein the:

generating a list of unsorted service data associated with the first service of the plurality of services available within the predetermined environment, wherein the list of unsorted service data is based on the source code and the documentation, and wherein said generating the list of unsorted service data comprises deploying the discovery API;

automatically pre-sorting the list of unsorted service data based on a predetermined set of heuristic rules based on the index of the plurality of services; and in response to a user confirmation, updating the index of the plurality of services based on the pre-sorting.

6. A method of operating a microservices registry hub associated with a microservice architecture application including a plurality of services, the plurality of services are each an application program interface (API) performing a piecemeal function of an overall application function, the method comprising:

storing, via the microservices registry hub, an index of the plurality of services, wherein the microservices registry hub is configured to implement services of the plurality of services to execution environments;

generating a list of unsorted service data associated with each service of the plurality of services available within a predetermined environment, wherein the predetermined environment is an execution environment wherein each service available within the predetermined environment is executing, and wherein said generating the list of unsorted service data comprises deploying a discovery API that observes;

automatically pre-sorting the list of unsorted service data based on a predetermined set of heuristic rules based on the index of the plurality of services;

in response to a user confirmation, updating the index of the plurality of services based on the pre-sorting; and reporting, by the discovery API to the microservices registry hub, data plane service traffic generated by each service available within the predetermined environment, wherein the list of unsorted service data is based on the data plane service traffic.

7. A method of operating a microservices registry hub associated with a microservice architecture application including a plurality of services, the plurality of services are each an application program interface (API) performing a piecemeal function of an overall application function, the method comprising:

storing, via the microservices registry hub, an index of the plurality of services, wherein the microservices registry hub is configured to implement services of the plurality of services to execution environments;

scraping, by a discovery API to the microservices registry hub, source code and documentation associated with each service available within a predetermined environment, wherein the predetermined environment is a source code repository wherein the source code and the documentation associated with each service available within the predetermined environment is stored, and wherein the discovery API;

generating a list of unsorted service data associated with each service of the plurality of services available within the predetermined environment, wherein the list of unsorted service data is based on the source code and the documentation, and wherein said generating the list of unsorted service data comprises deploying the discovery API;

automatically pre-sorting the list of unsorted service data based on a predetermined set of heuristic rules based on the index of the plurality of services; and in response to a user confirmation, updating the index of the plurality of services based on the pre-sorting.

8. The method of claim 7, wherein the predetermined environment comprises a control plane that is communicatively connected to a plurality of data plane proxies associated with a set of executing services and said generating the list of unsorted service data includes:

receiving, at a microservice control plane, proxied data plane service traffic from the set of executing services; and reporting, by the control plane to the microservices registry hub, the proxied data plane service traffic generated by the set of executing services available within the predetermined environment, wherein the list of unsorted service data is based on the proxied data plane service traffic.

9. The method of claim 7, wherein the index of the plurality of services includes, for each service, any of:

a name;

a specification;

a version history;

a list of instances;

configuration data associated with any of versions or instances; or functional runtime group data.

10. The method of claim 7, wherein the user confirmation is configured to auto confirm a first pre-sorted service entry based on the first pre-sorted service entry matching a first rule of the predetermined set of heuristic rules.

11. A system implementing a microservices registry hub associated with a microservice architecture application including a plurality of services, the plurality of services is each an application program interface (API) performing a piecemeal function of an overall application function, the system comprising:

a processor;

a memory that stores, associated with the microservices registry hub, an index of the plurality of services, the memory further including instructions that when executed by the processor enable the microservices registry hub to implement services of the plurality of services to execution environments; and a network interface that is communicatively coupled with a discovery API that executes in a predetermined environment, wherein the predetermined environment is an execution environment wherein a first service of the plurality of services available within the predetermined environment is executing, and wherein the discovery API is configured to observe the first service available within the predetermined environment; and wherein the memory further includes instructions that when executed, cause the processor to:

generate, based on communication from the discovery API, a list of unsorted service data associated with the first service available within the predetermined environment;

automatically pre-sort the list of unsorted service data based on a predetermined set of heuristic rules based on the index of the plurality of services; and in response to a user confirmation, update the index of the plurality of services based on the pre-sorting; and reporting, by the discovery API to the microservices registry hub, data plane service traffic generated by the first service available within the predetermined environment, wherein the list of unsorted service data is based on the data plane service traffic.

12. The system of claim 11, wherein the index of the plurality of services includes, for each service, any of:

a name;

a specification;

a version history;

a list of instances;

configuration data associated with any of versions or instances; or functional runtime group data.

13. The system of claim 11, wherein the user confirmation is configured to auto confirm a first pre-sorted service entry based on the first pre-sorted service entry matching a first rule of the predetermined set of heuristic rules.

14. A system implementing a microservices registry hub associated with a microservice architecture application including a plurality of services, the plurality of services is each an application program interface (API) performing a piecemeal function of an overall application function, the system comprising:

a processor;

a memory that stores, associated with the microservices registry hub, an index of the plurality of services, the memory further including instructions that when executed by the processor enable the microservices registry hub to implement services of the plurality of services to execution environments; and a network interface that is communicatively coupled with a discovery API that executes in a predetermined environment, wherein the predetermined environment is a source code repository wherein source code and documentation associated with a first service of the plurality of services available within the predetermined environment is stored wherein the memory further includes instructions that when executed, cause the processor to:

scrape, by the discovery API to the microservices registry hub, the source code and the documentation associated with the first service available within the predetermined environment;

generate, based on communication from the discovery API, a list of unsorted service data associated with the first service available within the predetermined environment, wherein the list of unsorted service data is based on the source code and the documentation;

automatically pre-sort the list of unsorted service data based on a predetermined set of heuristic rules based on the index of the plurality of services; and in response to a user confirmation, update the index of the plurality of services based on the pre-sorting.

* * * * *